United States Patent [19]

Huang

[11] 4,324,841

[45] * Apr. 13, 1982

[54] LITHOGRAPHIC SUBSTRATES

[75] Inventor: Jen-chi Huang, Ossining, N.Y.

[73] Assignee: Polychrome Corporation, Yonkers, N.Y.

[ * ] Notice: The portion of the term of this patent subsequent to May 6, 1997, has been disclaimed.

[21] Appl. No.: 178,656

[22] Filed: Aug. 15, 1980

Related U.S. Application Data

[63] Continuation-in-part of Ser. No. 69,482, Aug. 24, 1979, Pat. No. 4,242,417, which is a continuation-in-part of Ser. No. 937,222, Aug. 28, 1978, Pat. No. 4,201,836.

[51] Int. Cl.[3] ........................ B32B 15/04; B05D 3/12; G03C 1/94

[52] U.S. Cl. .................................... 428/457; 156/153; 156/665; 204/33; 204/58; 204/140; 427/307; 427/309; 427/435; 427/444; 428/469; 428/908; 430/278; 430/302

[58] Field of Search ............... 428/105, 457, 908, 469; 427/307, 309, 435, 444; 204/33, 58, 140; 156/665, 153, 154; 430/278, 323, 327, 302

[56] References Cited

U.S. PATENT DOCUMENTS

| | | | |
|---|---|---|---|
| 2,209,712 | 7/1940 | Brennan | 204/33 X |
| 3,072,546 | 1/1963 | Wruck | 204/141 |
| 3,073,765 | 1/1963 | Adams | 204/141 |
| 3,755,116 | 8/1973 | Terai et al. | 204/33 X |
| 4,086,114 | 4/1978 | Karof | 156/153 |
| 4,126,483 | 11/1978 | Donakowski et al. | 156/665 X |
| 4,152,158 | 5/1979 | Chu | 204/33 X |
| 4,201,836 | 5/1980 | Huang | 428/457 |
| 4,242,417 | 12/1980 | Huang | 428/457 |

FOREIGN PATENT DOCUMENTS 896563 5/1962 United Kingdom .

*Primary Examiner*—Thomas J. Herbert, Jr.

[57] ABSTRACT

A method for the production of aluminum substrates useful in the production of lithographic printing plates which comprises mechanically graining the surface of an aluminum sheet, subsequently finely graining the mechanically grained sheet in a saturated solution of an aluminum salt of a mineral acid to which up to 10% of a mineral acid has been added, with discretional electrolysis, and then optionally anodizing the sheet.

22 Claims, No Drawings

LITHOGRAPHIC SUBSTRATES

CROSS REFERENCE TO RELATED APPLICATION

This application is a continuation-in-part of U.S. patent application Ser. No. 69,482 filed Aug. 24, 1979, U.S. Pat. No. 4,242,417 issued Dec. 30, 1980 which is a continuation-in-part of U.S. patent application Ser. No. 937,222 filed Aug. 28, 1978, U.S. Pat. No. 4,201,836 issued May 6, 1980.

BACKGROUND OF THE INVENTION

This invention relates to the treatment of aluminum surfaces, and more particularly to the treatment of aluminum surfaces to provide a surface thereon suitable for use in the production of lithographic printing plates.

There are many methods and processes which have been heretofore employed in the treatment of aluminum surfaces to render them suitable for use in the production of lithographic printing plates. One such method involves the electrolytic treatment of aluminum, for example, electrolytic etching by use of a hydrochloric acid electrolyte. Various prior art publications, for example, U.S. Pat. Nos. 3,072,546 and 3,073,765 and British Pat. Nos. 879,768 and 896,563 describe the treatment of aluminum surfaces with hydrochloric acid while applying an alternating current to the aluminum plates to render the plates suitable for lithographic use. While this treatment has been taught to be satisfactory, it actually possesses the undesirable property of requiring large quantities of expensive acids which, when spent, must be discarded as ecologically unacceptable effluent.

In addition, in the treatment of such aluminum association alloys as 1100 and 3003, a relatively large amount of electrical power has been required to obtain the degree of etching desired. It has also been found in the practice of the prior art processes that uniform etching of the surface is not obtained, and the character of the grain imparted to the surface is not consistent, portions thereof being relatively coarser than others, thus yielding an undesirable irregular surface which is not ideally suitable for lithographic use. When the surface of the aluminum sheet is irregular and non-uniform, it can interfere with the subsequent printing process when the surface is subsequently coated with a photosensitive resin as is employed in normal lithographic processes as is well known to the skilled worker.

Heretofore, various suggestions have been made to overcome the disadvantages encountered in the practice of the prior art processes. One such suggestion in U.S. Pat. No. 3,963,594 involves the use of a hydrochloric acid and gluconic acid electrolyte for etching. Other suggestions such as those contained in U.S. Pat. Nos. 3,342,711; 3,365,380 and 3,366,558 refer to an electrolytic polishing effect obtained on aluminum and other metals using a mixture which may include various electrolytes such as sulfuric acid and gluconic acid.

SUMMARY OF THE INVENTION

The present invention teaches a method of graining the surface of an aluminum sheet substrate which comprises subjecting said substrate first to a mechanical graining treatment and then to a saturated aqueous solution of an aluminum salt of a mineral acid to which optionally up to 10 percent of a mineral acid may be added. Optionally, the graining action of this solution may be aided by electrolysis and the graining may be followed by an anodizing treatment.

The important improvement with this method is that no effluent discharge is produced and the electricity required is drastically reduced. As a moving web of mechanically grained aluminum is passed through the aluminum salt solution, a second, fine graining action takes place. Necessarily, there are aluminum salt reaction products formed in the reaction between the web aluminum and the graining solution. However, since the graining solution is already saturated with aluminum salt, the additional aluminum salts formed merely precipitate out of the solution. The solution is maintained by merely replenishing the graining solution by adding whatever ingredients, such as excess acids, are required and by periodically filtering the precipitates. The need to frequently discharge a spent graining solution is thus obviated.

It is, therefore, an object of the present invention to provide an improved method of graining the surface of aluminum sheets.

It is another object of the present invention to provide an improved method of graining the surface of aluminum sheets whereby the need to discharge spent graining solutions as effluent is obviated.

It is still another object of this invention to provide a two step course/fine graining process which reduces or eliminates the electricity required for such graining.

These and other objects of the instant invention will be in part discussed and in part apparent upon a consideration of the detailed description of the preferred embodiment.

DETAILED DESCRIPTION OF THE PREFERRED EMBODIMENT

The aluminum sheets which may be employed in the practice of this invention, include those which are made from aluminum alloys which contain substantial amounts of impurities, including such alloys as aluminum association alloys 1100 and 3003. The thickness of the aluminum sheets which may be employed in the practice of this invention may be such as are usually and well known to be employable for such purposes, for example those which are from 0.004 inches to 0.025 inches in thickness; however, the exact choice of aluminum sheet may be left to the discretion of the skilled worker.

In the practice of the instant invention an aluminum sheet or web is first mechanically grained, for example by rubbing the surface with a wire brush or forcing an aqueous slurry of pumice or silica over the surface.

The web is then immersed in a saturated aqueous solution of an aluminum salt of a mineral acid to which optionally up to 10% by weight of a mineral acid has been added. The quantity of acid is based upon the weight of the anhydrous parts of said acid to the weight of the saturated solution.

Non-limiting examples of such aluminum salts include aluminum chloride, sulfate, phosphate, borate, acetate and nitrate.

Non-limiting examples of the mineral acids employable within the context of the instant invention include hydrochloric acid, sulfuric acid, phosphoric acid, boric acid, acetic acid and nitric acid.

In a preferred embodiment the immersion time ranges from 5 seconds to 5 minutes while the solution which contains 0 to 10% by weight of hydrochloric acid is maintained at 25° C. to 110° C.

In a more preferred embodiment immersion time ranges from 5 to 120 seconds while the solution which contains 2–5% by weight of HCl is maintained at 50° C. to 80° C.

In a most preferred embodiment the immersion time is 20 seconds while the solution which contains 5% by weight of HCl is maintained at 70° C.

Optionally, the graining or etching action may be aided by the use of electrolysis. In such a case, it is preferred that the aluminum be subjected, under electrolyzing conditions, to a current density of about 5 to 30 amps per square decimeter for up to about 3 minutes. The voltage employed is not critical.

The exact parameters of the conditions under which the electrolytic etching may be carried out may be varied and are within the purview of the skilled worker, depending upon the results wishes to be achieved in each specific case.

Subsequent to the graining of the aluminum surface hereunder, the aluminum may be further treated to produce the desired lithographic printing plates. Thus, the electrolytically etched aluminum may be subsequently coated with a lithographically suitable photosensitive coating for such purposes or, alternatively, the electrolytically etched surface may be anodized, for example, with alternating or direct current in a suitable electrolyte, such as sulfuric or phosphoric acid, prior to the application to the thus anodized surface of a lithographically suitable photosensitive coating. One typical though non-limiting anodization would be treatment with direct current in an aqueous electrolyte solution comprised of from 4 to 30 percent by weight of sulfuric acid, and wherein the direct current voltage is from 10 to 25 volts, and the current density is from 1.1 to 4.3 amperes per square decimeter, to provide a hard, abrasion resistant, porous surface on said aluminum sheet.

As a further option, an interlayer composition may be applied between the treated substrate and the lithographic photosensitive coating.

Interlayer compositions employable in the practice of this invention include those which may be applied as aqueous solutions, such as aqueous solutions of alkali metal silicate, such as sodium silicate, silicic acid, the Group IV-B metal fluorides, polyacrylic acid, the alkali zirconium fluorides, such as potassium zironcium hexafluoride, or hydrofluozirconic acid which are applied in concentrations of 0.5 to 20% by volume.

The invention may be illustrated by the following examples:

EXAMPLE 1

A sheet of degreased grade 1100 aluminum was mechanically grained by rubbing its surface with an aqueous pumice slurry and then was immersed in a 5% aqueous HCl solution of saturated aluminum chloride maintained at 70° C., for 20 seconds. After cleaning and drying, the sample was examined under an electron microscope. The sheet surface possessed a uniformly roughened topography which successfully accepted an adherent photosensitive coating commonly used in lithography.

EXAMPLE 2

Example 1 was repeated except the aluminum was subjected to electrolysis at 15 amps/$dm^2$. Similar results were obtained.

EXAMPLE 3

Example 1 was repeated except the mechanical graining was performed by rubbing the aluminum surface with a wire brush. Similar results were obtained except a more directional grain pattern was noticed.

EXAMPLE 4

Example 1 was repeated except prior to applying the photosensitive coating the sheet was anodized in a 18% by weight sulfuric acid bath with a 15 volt, 1.6 ampere per decimeter direct current. The sheet exhibited a hard, porous anodic coating.

It is, of course, to be understood that the foregoing examples are for the purpose of illustrating the invention only and are not to be construed as limitations to the scope of the invention as claimed hereinafter.

What is claimed is:

1. An aluminum sheet provided with at least one surface suitable for lithography by a method which comprises the steps of:

a. mechanically graining said surface; and, b. immersing said aluminum sheet in a saturated aqueous solution of an aluminum salt of a mineral acid for a period of time from about 5 seconds to about 5 minutes at about 25° C. to about 110° C.

2. The sheet of claim 1 wherein said aluminum is electrolyzed in said solution.

3. The sheet of claim 1 wherein said solution further comprises up to about 10% by weight of a mineral acid.

4. The sheet of claim 3 wherein said acid is selected from the group consisting of hydrochloric acid, sulfuric acid, phosphoric acid, boric acid, nitric acid and acetic acid.

5. The sheet of claim 3 wherein said acid is hydrochloric acid and said aluminum salt is aluminum chloride.

6. The sheet of claim 3 wherein the time of immersion ranges from about 5 to about 120 seconds at from about 50° C. to 80° C.

7. The sheet of claim 4 wherein the aluminum is electrolyzed in said solution.

8. The sheet of claim 1 or 3 wherein said aluminum salt is selected from the group consisting of one or more of aluminum chloride, sulfate, phosphate, borate, acetate and nitrate.

9. The sheet of claim 1 or 3 wherein said mechanical graining step comprises abrading the aluminum surface with a wire brush or an aqueous pumice slurry.

10. A lithographic printing plate which comprises a photosensitive coating applied to the sheet of claim 1 or 3.

11. The sheet prepared by the method of claim 1 or 3 further comprising the subsequent step of anodizing said sheet.

12. The sheet of claim 10 wherein said anodizing is conducted in an electrolyte comprising sulfuric or phosphoric acid.

13. The sheet of claim 3 wherein the time of immersion is 20 seconds at 70° C., and the solution is a saturated aluminum chloride solution containing 5% hydrochloric acid.

14. The sheet of claim 13 wherein the mechanical graining step comprises abrading the aluminum surface with a wire brush.

15. The sheet of claim 13 wherein the mechanical graining step comprises abrading the aluminum surface with an aqueous pumice slurry.

16. An aluminum sheet provided with at least one surface suitable for lithography by a method which comprises the steps of, a. mechanically graining said surface by abrading with a wire brush or aqueous pumice slurry;

b. immersing said aluminum sheet in a saturated aqueous solution of aluminum chloride, sulfate, phosphate, borate, acetate or nitrate for a period of time from about 5 seconds to about 5 minutes at from about 25° C. to about 110° C.; and, c. anodizing said sheet in an electrolyte comprising sulfuric or phosphoric acid.

17. The aluminum sheet of claim 16 wherein the immersion solution further comprises up to 10% by weight of a mineral acid.

18. The aluminum sheet of claim 17 wherein step (a) is conducted with an aqueous pumice slurry or a wire brush and, step (b) is conducted in a saturated aluminum chloride solution containing up to 10% by weight of hydrochloric acid at a temperature of about 25° C. to 110° C. for about 5 seconds to 5 minutes.

19. The aluminum sheet of claim 18 wherein the concentration of hydrochloric acid is 2 to 5% wt., and the immersion time is 5 to 20 seconds at 50° C. to 80° C.

20. The aluminum sheet of claim 19 wherein the concentration of hydrochloric acid is 5% wt. and the immersion time is 20 seconds at 70° C.

21. The sheet produced according to the method of any one of claims 1, 16 or 17 further comprising the subsequent steps of, d. applying to said surface an interlayer composition comprising alkali metal silicate, silicic acid, Group IV-B metal fluorides, polyacrylic acid, the alkali zirconium fluorides or hydrofluozirconic acid; and, e. applying a photosensitive composition to said interlayer composition.

22. A lithographic printing plate which comprises a photosensitive composition applied to the sheet of any one of claims 16 and 17 to 21.

* * * * *